United States Patent Office 3,658,792
Patented Apr. 25, 1972

3,658,792
DIACYL PENICILLINS AND METHODS FOR THEIR PRODUCTION
Jinnosuke Abe, Shizuoka, Tetsuo Watanabe, Kanagawa, and Teruo Take, Kentaro Fujimoto, Tadashiro Fujii, Kazunari Takemura, and Kazuyoshi Nishiie, Shizuoka, Japan, assignors to Toyo Jozo Kabushiki Kaisha, Ohitocho, Shizuoka-ken, Japan
No Drawing. Filed Apr. 7, 1970, Ser. No. 26,397
Int. Cl. C07d 99/16
U.S. Cl. 260—239.1
9 Claims

ABSTRACT OF THE DISCLOSURE

Novel diacyl penicillins of the formula

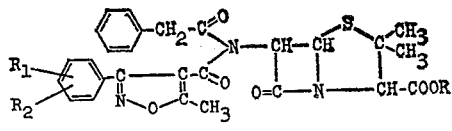

(I)

wherein R is a protective group for the carboxyl group, and $R_1$ and $R_2$ are individually hydrogen or halogen, are produced by reacting a benzyl penicillin ester of the formula

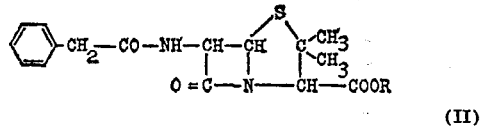

(II)

wherein R is as defined above, with a chlorinating agent in the presence of a tertiary organic base to obtain an imide chloride group-incorporated compound of the formula

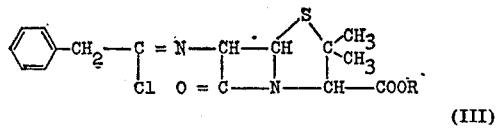

(III)

and then reacting the compound of the last-named formula with an isoxazol carboxylate of the formula

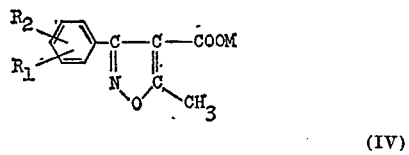

(IV)

wherein M is a metal atom, and $R_1$ and $R_2$ are as defined above.

---

This invention relates to novel diacyl penicillins of the formula

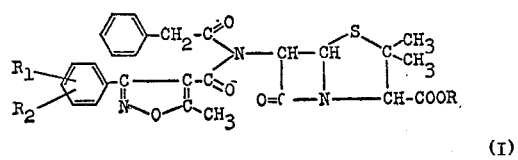

(I)

wherein R is a protective group for the carboxyl group, and $R_1$ and $R_2$ are individually hydrogen or halogen, and methods for their production.

More particularly, the invention pertains to novel penicillins of Formula I and methods for their production, characterized in that a benzyl penicillin ester of the formula

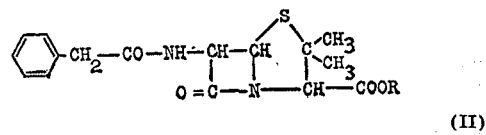

(II)

wherein R is as defined above is reacted with a chlorinating agent in the presence of a tertiary organic base to obtain an imide chloride group-incorporated compound of the formula

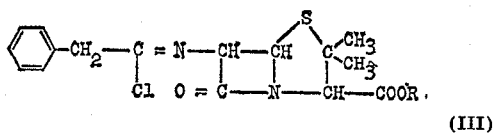

(III)

wherein R is as defined above; the compound of Formula III is reacted with an isoxazol carboxylate of the formula

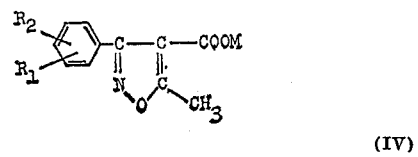

(IV)

wherein M is a metal atom, and $R_1$ and $R_2$ are as defined previously, to obtain a diacyl penicillin ester

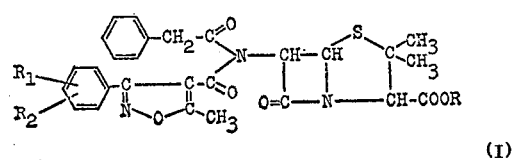

(I)

of Formula I.

Heretofore, acyl derivatives of 6-aminopenicillanic acid, so called synthetic penicillins, have been prepared in such a manner that 6-aminopenicillanic acid is acylated according to such acylation process as acid halide process, acid anhydride process, mixed acid anhydride process, active ester process or process using a condensing agent. 6-aminopenicillanic acid used in the above processes, however, has to be prepared from fermentation broth in such a manner that benzylpenicillin or phenoxymethylpenicillin obtained by fermentation is deacylated with an enzyme produced by microorganisms, or 6-aminopenicillanic acid obtained by direct fermentation. According to these processes, however, the 6-aminopenicillanic acid should be isolated from the fermentation liquor; but the isolation step is troublesome because of the instability of the amphoteric water soluble compound. As a result, synthetic penicillins are expensive.

The present invention is characterized by the fact that penicillin derivatives are prepared chemically without using 6-aminopenicillanic acid but using as a starting material inexpensive benzylpenicillin G obtainable by fermentation.

An object of the present invention is to provide novel diacyl penicillins and processes for preparing the same which are entirely different in inventive concept from the conventional processes for preparing penicillin derivatives by acylating 6-aminopenicillanic acid.

In the present invention, benzylpenicillin (hereinafter designated as PcG) obtained by fermentation is used as a starting material. However, the PcG is not used as it is but is used in the form of an ester such as benzylpenicillin ester of Formula II (hereinafter referred to as "PcG ester II") which is formed by introducing a protective group into the carboxyl group of PcG.

The carboxyl group of PcG is protected so that no side reaction will be brought about in the subsequent reaction, i.e. the reaction with a chlorinating agent.

The above-mentioned introduction of a protective group is carried out by introducing into a potassium or sodium salt of PcG obtained by fermentation a protective group such as is used ordinarily in the synthesis of peptides. Examples of protective groups which may be introduced are methyl, ethyl, t-butyl, p-methoxybenzyl, benzyl, p-nitrobenzyl, benzhydril, phenacyl, p-bromophenacyl and trimethylsilyl groups. Generally, however, the protective group introduced should be eliminated in the final step and therefore it is desirable to select a group capable of being easily eliminated without having any detrimental effect on the structure of penicillin. Favorable results are obtained by the use fo such protective groups as, for example, benzyl, p-nitrobenzyl and benzhydril groups which can be easily eliminated by catalytic reduction, or phenacyl and p-bromophenacyl groups which can be eliminated with sodium thiophenoxide.

Generally, penicillins are unstable to acids and alkalis. Accordingly, when such a protective group which is eliminated by strong acid or alkali hydrolysis, e.g. a methyl, ethyl, t-butyl or p-methoxybenzyl group, has been introduced, the elimination thereof is difficult because a destruction in the structure of penicillin is brought about at the time of the elimination reaction. In the present invention, however, even when the final products, i.e. penicillin derivatives of Formula I (hereinafter designated as DA-Pc ester I) are in the form of esters having protective groups, the object of the invention can be accomplished without eliminating the protective groups so far as the protective groups are those of the kind which do not have pharmacologically detrimental effects. Examples of such protective groups are lower alkyl groups such as methyl, ethyl and the like groups.

In accordance with the present invention, the PcG ester II is reacted with a chlorinating agent to obtain an imide chloride group-incorporated compound of Formula III (hereinafter referred to as "the imide chloride III"). The above reaction is an application of a process in which an N-mono-substituted carboxylic acid amide is treated with a chlorinating agent to produce a corresponding imide chloride group-incorporated compound, and it is most preferable to adopt a process in which the reaction is effected, in the presence of a tertiary organic base, using $PCl_5$ or another such chlorinating agent as $PCl_3$, $POCl_3$, $COCl_2$, $SOCl_2$, etc. (South African Pat. 67/2,927).

In the above reaction, it is preferable to use a suitable dry organic solvent. This solvent is desirably selected with a view to such factors as that it should not substantially detrimentally affect the reaction; that it should be able to solubilize the PcG ester II; and that it should be an organic solvent immiscible with water because, after the reaction, by-products formed are removed by washing. For example, benzene, toluene, chloroform, dichloromethane, dichloroethane, ethyl ether, or isopropyl ether are advantageously used.

If $PCl_5$, for example, is used in the above reaction as the chlorinating agent, $POCl_3$ and HCl are necessarily formed. In case a hydrochloride of the tertiary organic base has precipitated in the reaction liquid, it is previously removed by filtration and, since the imide chloride III obtained is relatively stable to water, $POCl_3$ can be removed from the reaction liquid by washing with an aqueous weakly alkali solution, e.g. an aqueous sodium or potassium bicarbonate solution. It is desirable that the above washing operation be carried out as quickly as possible and, after the washing, the reaction mother liquor be immediately dried by addition of anhydrous sodium sulfate or magnesium sulfate.

In view of the fact that compounds having imide chloride groups are generally unstable to water, it is an entirely surprising fact that the imide chloride III obtained by the aforesaid reaction is relatively stable to water. Further, it brings about extremely favorable results for the present invention that, by the above-mentioned operation, a reaction mother liquor containing the imide chloride III can be obtained in a stable state.

In the above-mentioned reaction mother liquor, the unreacted tertiary organic base remains as it is. This base can be easily removed from the reaction mother liquor as a water-soluble acid addition salt by washing the liquor with a dilute acid. However, the imide chloride III is unstable to acids and therefore it is desirable that said base not be removed. As the tertiary organic base employed in the present invention, therefore, the use of such a weakly basic base as pyridine, quinoline, dimethylaniline or the like, for example, gives favorable results. This is because in the subsequent reaction, i.e. in the step where the imide chloride III is reacted with an isoxazol carboxylate of Formula IV (hereinafter referred to as "the carboxylate IV") to form a DA-Pc ester of Formula I, if a tertiary organic amine high in basicity, e.g. triethylamine or the like, is present, there is grave danger that a stereochemical rearrangement (epimerization) will take place in the hydrogen atom at the 6-position of the penicillin nucleus; but in the presence of such a weakly basic base as pyridine, there is little danger of epimerization.

The imide chloride III contained in the above-mentioned reaction mother liquor may be reacted as is, without any further purification, with the carboxylate IV. Alternatively, it may be reacted with the carboxylate IV after concentrating the reaction mother liquor and dispersing the concentrate in another suitable solvent, e.g. benzene, toluene, chloroform, dichloromethane, dichloroethane, ethyl ether, isopropyl ether, tetrahydrofuran or dioxane. However, an aqueous solution treatment is effected after the reaction and therefore it is advantageous to use a water-immiscible solvent.

Examples of the carboxylate IV to be reacted with the imide chloride III are metal salts, such as potassium, sodium, lithium and silver salts, of 3-phenyl-5-methyl-isoxazol-4-carboxylic acid, 3-halogen substituted phenyl-5-methyl-isoxazol-4-carboxylic acid, such as 3-(2'-chlorophenyl)-5-methyl-isoxazol-4-carboxylic acid,
3-(2'-bromophenyl)-5-methyl-isoxazol-4-carboxylic acid,
3-(2'-fluorophenyl)-5-methyl-isoxazol-4-carboxylic acid,
3-(2',6'-dichlorophenyl)-5-methyl-isoxazol-4-carboxylic acid,
3-(2'-chloro-6'-fluorophenyl)-5-methyl-isoxazol-4-carboxylic acid and
3-(2'-bromo-6'-chlorophenyl)-5-methyl-isoxazol-4-carboxylic acid.

The carboxylate IV may be added directly to the reaction mother liquor containing the imide chloride III or may be used in the form of a suspension in the same solvent as in the reaction mother liquor. In this case, if a tertiary organic base of high basicity such as triethylamine or the like is used in place of the carboxylate IV, there is grave danger that the resulting DA-Pc ester I will cause epimerization at the hydrogen atom in the 6-position of the penicillin nucleus, as mentioned above. However, when a metal salt such as a potassium, sodium, lithium or silver salt is used, said epimerization can be prevented or the degree of epimerization can be greatly reduced.

Theoretically, the quantitative proportion of the carboxylate IV is equimolar to the imide chloride III. After the reaction, however, the removal of unreacted carboxylate IV is easier than the removal of unreacted imide chloride III. Ordinarily, therefore, the carboxylate IV is used somewhat in excess.

The above-mentioned reaction easily progresses at room temperature; however in case of low reaction rate, it is acceptable to heat to at most about 40–50° C., being careful not to decompose the imide chloride III or produced DA-Pc ester I by sudden heating or overheating.

According to the above reaction, there is obtained the DA-Pc ester I. In separating this reaction product, the reaction liquid is washed with an aqueous dilute acid solution, an aqueous dilute alkali solution, and water, in this order, to remove remaining tertiary organic base, e.g. pyridine or the like, and unreacted carboxylate IV, and then the reaction mother liquor is concentrated and is subjected to silica gel-column chromatography using a solvent of benzene-ethyl acetate or the like system, whereby only the desired DA–Pc ester I is first eluted. When the eluted fraction is subjected to freeze-drying or the like, the product can be easily isolated.

The thus obtained DA–Pc ester I is a novel compound, and further, by dephenylacetylation and de-esterification reactions, there can be prepared the important antibacterial agents comprising the isoxazolyl penicillins of the formula

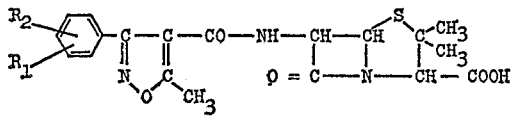

wherein $R_1$ and $R_2$ are defined previously. Thus the isoxazolyl penicillins are prepared by chemical reactions only, without using 6-aminopenicillanic acid but using PcG obtained by fermentation; and DA-Pc ester I prepared by the present invention is, therefore, a very important intermediate of a process for the production of isoxazolyl penicillins. Also, novel pencillins can be prepared by de-esterification of DA-Pc ester I.

The present invention will be illustrated in detail below with reference to various examples, it being understood that the various reaction operations and compounds which may be employed in the present invention are not limited to those shown in these examples.

EXAMPLE 1

Preparation of benzylpenicillin-p-bromophenacyl ester

A mixture comprising 391 g. (1.05 mole) of PcG potassium and 278 g. (1 mole) of p-bromophenacyl bromide was added to 350 ml. of dimethylformamide, and the reaction liquid was stirred while maintaining the temperature thereof at 15° C. The progress of the reaction was traced according to the iodine method on a silica gel thin layer-chromatogram, and the disappearance of p-bromophenacyl bromide was regarded as the end point of the reaction. After five hours, the reaction was substantially complete.

To the reaction mixture was added 1.1 liter of chloroform and the mixture was washed several times with water, with a 10% aqueous sodium carbonate solution, and again with water, in this order, to remove the reaction solvent and unreacted PcG. The chloroform layer was dried with anhydrous sodium sulfate and was concentrated in vacuo up to about half the initial volume. To this concentrate ligroin (about 800 ml.) was added with stirring, then PcG-p-bromophenacyl ester was precipitated. The pricipitate was filtered off and dried to obtain 504 g. of PcG-p-bromophenacyl ester, yield 90.4%.

The silica gel thin layer-chromatogram of this product was one spot. Benzene-ethyl acetate (10:1) was used as the developing solvent.

Elementary analysis for $C_{24}H_{23}O_5N_2SBr$. Found (percent): C, 53.93; H, 4.31; N, 5.38; Br, 15.43. Calculated (percent): C, 54.25; H, 4.36; N, 5.27; Br, 15.04.

EXAMPLE 2

Preparation of benzylpenicillin-p-nitrobenzyl ester

A mixture of 373 g. (1 mole) of PcG potassium and 185 g. (0.9 mole) of p-nitrobenzyl bromide was added to 400 ml. of dimethylformamide, and the reaction liquid was stirred while maintaining the temperature thereof at 40° C. The progress of the reaction was traced according to the iodine method on a silica gel thin layer-chromatogram, and the disappearance of p-nitrobenzyl bromide was regarded as the end point of the reaction.

To the reaction mixture after cooling was added 1.2 liter of benzene and the mixture was washed several times with water, with a 10% aqueous sodium carbonate solution, and again with water, in this order, to remove the reaction solvent and unreacted PcG potassium. This benzene solution was dried with anhydrous sodium sulfate and was then freeze-dried to obtain 340 g. of PcG-p-nitrobenzyl ester, yield 74.5%.

The silica gel thin layer-chromatogram of the abovementioned freeze-dried product was one spot. The developing solvent was the same as in Example 1.

Elemental analysis for $C_{23}H_{23}O_6N_3S$. Found (percent): C, 58.70; H, 4.96; N, 8.88. Calculated (percent): C, 58.85; H, 4.94; N, 8.95.

EXAMPLE 3

Preparation of N-(3-phenyl-5-methyl-isoxazole-4-carbonyl benzylpenicillin-p-bromophenacyl ester 50.3 g. (0.1 mole) of PcG-p-bromophenacyl ester was dissolved in 200 ml. of dry benzene. To this solution was added 32.4 ml. (0.4 mole) of dry pyridine while cooling to —7° C. and stirring. Thereafter, a solution of 21.8 g. (0.105 mole) of $PCl_5$ in 350 ml. of dry benzene was added dropwise over a period of about 30 minutes. Subsequently, the liquid was reacted for 1.5 hours while maintaining the temperature thereof at —5 to —7° C.

After the reaction, precipitated pyridine hydrochloride was removed by filtration, and the reaction mother liquor was quickly washed four times with 1 N aqueous sodium bicarbonate solution and twice with water to remove unreacted $PCl_5$ and by-product $POCl_3$. The washed benzene solution was dried with anhydrous sodium sulfate while ice-cooling, and then 36.2 g. (0.15 mole) of potassium 3-phenyl-5-methyl-isoxazol-4-carboxylate was immediately added. The reaction mixture was reacted for four hours at 30–35° C. with gentle heating and for one hour at 45° C.

The reaction mixture was washed with 0.5 N hydrochloric acid, with 1 N aqueous sodium bicarbonate solution, with saturated sodium chloride solution, and with water, in this order, to remove unreacted pyridine and 3-phenyl-5-methyl-isoxazol-4-carboxylic acid, and the reaction mother liquor was dried with anhydrous sodium sulfate, and was then concentrated in vacuo.

Subsequently, the concentrate was charged on 500 g. of silica gel column (60–80 mesh; product of Merck & Co., U.S.A.) and was eluted with anhydrous benzeneethyl acetate (10:1), whereby the first eluted fraction contained a desired N-(3-phenyl-5-methylisoxazole-4-carbonyl)-benzylpenicillin-6-bromophenacyl ester. This fraction was collected and freeze-dried to obtain 44.8 g. of freeze-dried product, yield 62.5%.

Elementary analysis for $C_{35}H_{30}O_7N_3SBr$. Found (percent): C, 58.93; H, 4.15; N, 5.78. Calculated (percent): C, 58.66; H, 4.22; N, 5.86.

EXAMPLE 4

Preparation of N-[3-(2'-chlorophenyl)-5-methyl-isoxazole-4-carbonyl]-benzylpenicillin-p-bromophenacyl ester 50.3 g. (0.1 mole) of the PcG-p-bromophenacyl ester was dissolved in 200 ml. of dry benzene. To this solution was added 32.4 ml. (0.4 mole) of dry pyridine while cooling to −7° C. and stirring. Thereafter, a solution of 21.8 g. (0.105 mole) of PCl₅ in 350 ml. of dry benzene was added dropwise over a period of about 45 minutes. Subsequently, the liquid was reacted for three hours while maintaining the temperature thereof at −5 to −7° C.

After the reaction, precipitated pyridine hydrochloride was removed by filtration, and the reaction mother liquor was quickly washed four times with 1 N aqueous sodium bicarbonate solution and twice with water to remove unreacted PCl₅ and by-product POCl₃. The washed benzene solution was dried with anhydrous sodium sulfate while ice-cooling, and then 41.4 g. (0.15 mole) of potassium 3-(2′-chlorophenyl)-5-methyl-isoxazol-4-carboxylate was immediately added, and was stirred at 30–35° C. with gentle heating for 1.5 hours and at 40° C. for two hours.

The reaction liquid was washed with 0.5 N hydrochloric acid, with a 1 N aqueous sodium bicarbonate solution, with an aqueous saturated sodium chloride solution, and with water, in this order, to remove unreacted 3-(2′-chlorophenyl)-5-methylisoxazol-4 - carboxylic acid, and the reaction mother liquor was dried with anhydrous sodium sulfate and was then concentrated under reduced pressure. Subsequently, the concentrate was charged on a column comprising 500 g. of silica gel (60–80 mesh) and was eluted with anhydrous benzene-ethyl acetate (10:1), whereby the first eluted fraction contained a desired N - [3-(2′-chlorophenyl)-5-methyl-isoxazole-4-carbonyl]-benzylpenicillin-p-bromophenacyl ester. This fraction was collected and was freeze-dried to obtain 56.0 g. of a freeze-dried product, yield 74.5%.

Elementary analysis for $C_{35}H_{29}O_7N_3SClBr$. Found (percent): C, 55.59; H, 3.78; N, 5.71. Calculated (percent): C, 55.97; H, 3.89; N, 5.59.

EXAMPLE 5

Preparation of N-(3-phenyl-5-methyl-isoxazole-4-carbonyl)-benzylpenicillin-p-nitrobenzyl ester Example 3 was repeated, except that the benzylpenicillin-p-nitrobenzyl ester was used in place of the benzylpenicillin-p-bromophenacyl ester, to obtain N-(3-phenyl-5 - methyl-isoxazole-4-carbonyl)-benzylpenicillin-p-nitrobenzyl ester, yield 62.0%.

Elementary analysis for $C_{34}H_{30}O_8N_4S$. Found (percent): C, 62.45; H, 4.58; N, 8.67. Calculated (percent): C, 62.38; H, 4.62; N, 8.56.

EXAMPLE 6

Preparation of N-[3-(2′-chlorophenyl)-5-methyl-isoxazolyl-4-carbonyl]-benzylpenicillin-p-nitrobenzyl ester Example 4 was repeated, except that benzylpenicillin-p-nitrobenzyl ester was used in place of the benzylpenicillin-p-bromophenacyl ester, to obtain N-[3-(2′-chlorophenyl) - 5 - methyl-isoxazole-4-carbonyl]-benzylpenicillin-p-nitrobenzyl ester, yield 60.4%.

Elementary analysis for $C_{34}H_{29}O_8N_4SCl$. Found (percent): C, 58.98; H, 4.30; N, 8.00. Calculated (percent): C, 59.26; H, 4.24; N, 8.13.

EXAMPLE 7

In Example 3, potassium 3-phenyl-5-methyl-isoxazol-4-carboxylate was replaced successively by the following compounds:

potassium 3-(2′-bromophenyl)-5-methyl-isoxazol-4-carboxylate;
potassium 3-(2′-fluorophenyl)-5-methyl-isoxazol-4-carboxylate;
potassium 3-(2′,6′-dichlorophenyl)-5-methyl-isoxazol-4-carboxylate;
potassium 3-(2′-chloro-6′-fluorophenyl)-5-methyl-isoxazol-4-carboxylate; and
potassium 3-(2′-bromo-6′-chlorophenyl)-5-methyl-isoxazol-4-carboxylate.

Products in the following order were obtained:

N-[3-(2′-bromophenyl)-5-methyl-isoxazole-4-carbonyl]-benzylpenicillin-p-bromophenacyl ester, yield 63.4%.
N-[3-(2′-fluorophenyl)-5-methyl-isoxazole-4-carbonyl]-benzylpenicillin-p-bromophenacyl ester, yield 53.8%.
N-[3-(2′,6′-dichlorophenyl)-5-methyl-isoxazole-4-carbonyl]-benzylpenicillin-p-bromophenacyl ester, yield 58.7%.
N-[3-(2′-chloro-6′-fluorophenyl)-5-methyl-isoxazole-carbonyl]-benzylpenicillin-p-bromophenacyl ester, yield 64.7%.
N-[3-(2′-bromo-6′-chlorophenyl)-5-methyl-isoxazole-4-carbonyl]-benzylpenicillin-p-bromophenacyl ester, yield 46.2%.

Having described our invention, we claim:

1. A diacyl penicillin of the formula

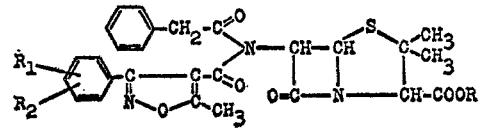

wherein R is a member selected from the group consisting of lower alkyl of $C_{1-4}$, p-methoxybenzyl, benzyl, p-nitrobenzyl, benzhydril, phenacyl, p-bromophenacyl and trimethylsilyl, and $R_1$ and $R_2$ are individually a member selected from the group consisting of hydrogen and halogen.

2. N - (3 - phenyl - 5 - methyl-isoxazole-4-carbonyl)-benzylpenicillin-p-bromophenacyl ester.

3. N - (3 - phenyl - 5 - methyl-isoxazole-4-carbonyl)-benzylpenicillin-p-nitrobenzyl ester.

4. N - [3 - (2′ - chlorophenyl) - 5 - methyl-isoxazole-4-carbonyl]-benzylpenicillin-p-nitrobenzyl ester.

5. N - [3 - (2′,6′ - dichlorophenyl) - 5 - methyl-isoxozole - 4-carbonyl]-benzylpenicillin-p-bromophenacyl ester.

6. N - [3 - (2′ - chloro - 6′ - fluorophenyl) - 5 - methyl-isoxazole - 4-carbonyl]-benzylpenicillin-p-bromophenacyl ester.

7. A process for the production of a diacyl penicillin according to claim 1, comprising reacting a benzylpenicillin ester of the formula

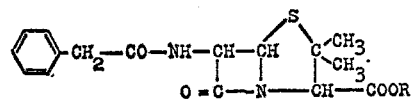

wherein R is as defined above, with a member selected from the group consisting of PCl₅, PCl₃, POCl₃, COCl₂ and SOCl₂ in the presence of pyridine to obtain an imide chloride group-incorporated compound of the formula

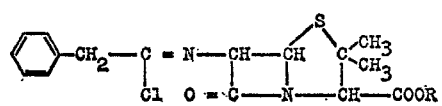

wherein R is as defined above; and then reacting the compound of the last-named formula with an isoxazol carboxylate of the formula

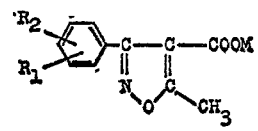

wherein M is a metal atom, and $R_1$ and $R_2$ are as defined above.

8. A process according to claim 7, wherein the carboxyl group protected benzylpenicillin is in the form of a mixture of 1 mole thereof with 1–2 moles of chlorinating agent in the presence of 1–5 moles of tertiary organic amine, and the reaction is carried out at a temperature of −20 to 25° C.

9. A process according to claim 7, wherein said imide chloride group-incorporated compound is used in the form of a mixture of 1 mole thereof with 1–2 moles of said isoxazol carboxylate, and the reaction is carried out at a temperature of 20 to 50° C.

References Cited

UNITED STATES PATENTS

| | | | |
|---|---|---|---|
| 3,352,850 | 11/1967 | Doyle et al. | 260—239.1 |
| 3,534,020 | 10/1970 | Essery et al. | 260—239.1 |

NICHOLAS S. RIZZO, Primary Examiner

U.S. Cl. X.R.

424—271